(12) United States Patent
Christiansen

(10) Patent No.: US 6,675,701 B2
(45) Date of Patent: Jan. 13, 2004

(54) EGG BREAKER DEVICE

(76) Inventor: Lyle J. Christiansen, 701 Imperial Dr., Morris, MN (US) 56267

( * ) Notice: Subject to any disclaimer, the term of this patent is extended or adjusted under 35 U.S.C. 154(b) by 0 days.

(21) Appl. No.: 10/122,119

(22) Filed: Apr. 15, 2002

(65) Prior Publication Data

US 2003/0192437 A1 Oct. 16, 2003

(51) Int. Cl.[7] .............................. A47J 43/14; A23N 5/00
(52) U.S. Cl. .............................. 99/582; 99/568; 99/571; 99/509
(58) Field of Search ................... 99/571, 574, 581, 99/582, 568, 509

(56) References Cited

U.S. PATENT DOCUMENTS

| 2,706,507 A | * | 4/1955 | Bartell |
| 3,338,280 A | * | 8/1967 | Christiansen |
| 3,958,505 A | | 5/1976 | Baker ........................ 99/495 |
| 4,542,584 A | * | 9/1985 | Talbot ..................... 99/568 X |
| 5,197,380 A | | 3/1993 | Fisher ....................... 99/580 |

* cited by examiner

Primary Examiner—Reginald L. Alexander

(57) ABSTRACT

A simple hand operated device which comprises only two members, a top member (12) which is hinged (14) to a bottom member (16). The top member comprises downward projecting ribs (10) which are located on its underside. The bottom member comprises one or more concavities (18) which are located on the bottom member's upper surface and where an egg or more would sit in.

1 Claim, 1 Drawing Sheet

EGG BREAKER DEVICE

CROSS-REFERENCE TO RELATED APPLICATIONS

"Not applicable."

STATEMENT REGARDING FEDERALLY SPONSORED RESEARCH OR DEVELOPMENT

"Not applicable."

INCORPORATION-BY REFERENCE OF MATERIAL SUBMITTED ON A COMPACT DISC or REFERENCE TO A "MICROFICHE APPENDIX"

"Not applicable."

BACKGROUND OF THE INVENTION

Field of the Invention

This invention related to a hand operated device for use in breaking eggs precisely.

Description of related art including information disclosed under 37 CFR 1.97 and 1.98: Some inventors have created devices for breaking multiple eggs at a time. U.S. Pat. No. 5,197,380 to Fisher (1993) describes an egg breaker which comprises a cutting means rotatably attached to a pan which slides across and cutting of the upper portions of eggs. This egg breaker is designed for commercial food operations and would be impractical for home kitchen use. U.S. Pat. No. 3,958,505 to Baker (1976) describes an egg cracking machine that also comprises a blade which severs the top portion of the egg. This egg cracking machine is also more for commercial operations. Also U.S. Pat. No. 2,706,507 to Bartell describes an egg breaker which breaks an egg in half and empties the egg also. This attempt at an egg breaker is complex and comprises multiple members and therefore would not be practical to manufacture. U.S. Pat. No. 3,338,280 by Leo Christiansen describes an egg opener which simultaneously opens a plurality of eggs. This egg opener also comprises multiple members and would be difficult to manufacture. U.S. Pat. No. 4,542,584 describes an egg cracking device which comprises handle arms which are hinged and allows an operator to separate two halves of the device and allow a cracked egg's contents to drop into a container or pan. This invention also comprises multiple members and would be difficult to manufacture.

Applicant's egg breaker would be simple to manufacture and easy to use in a home kitchen.

BRIEF SUMMARY OF THE INVENTION

The present invention of an egg breaking device makes it possible to precisely put cuts across the width of an egg or eggs so that one does not need to snap an egg against a pan or container to effect a break. Precise breaks are accomplished with one movement by simply closing a hinged top member of the device, which comprises egg breaking ribs, onto the eggs sitting on the bottom member of the device. One then only needs to pick up the eggs, spread them apart at the break with one's thumbs and deposit them into a pan or container. Prior art has complicated their inventions by including unnecessary features, such as for dropping the eggs into a pan or container.

DETAILED DESCRIPTION OF THE INVENTION

Figure 1:
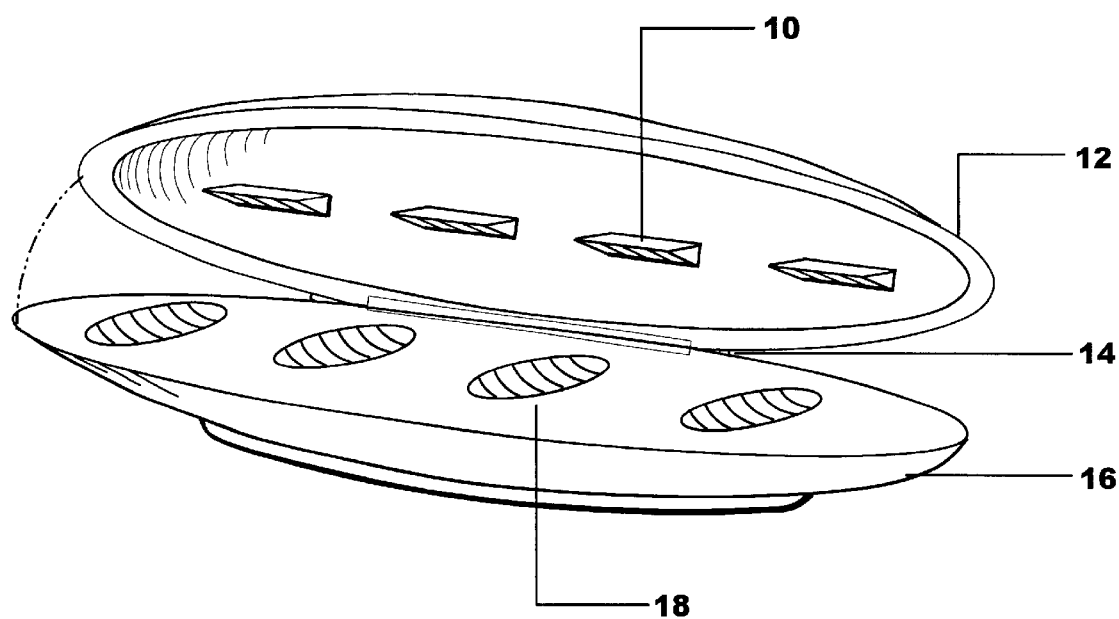
FIG. 1 shows an egg breaking device with its top member partially open and showing ribs which are attached to or incorporated in said top member's underside and showing the concavities located on the upper surface of the bottom member of the device.

In FIG. 1, the top member 12 comprises one or more downward projecting ribs 10 which are located on its underside. The top member is hinged 14 to the bottom member 16 of the device. Located along the upper surface of the bottom member are one or more concavities 18. The device could be constructed of a number of different materials. A molded plastic would be one choice. The shape of the device could be of many different shapes or sizes depending on the number of eggs designed to be broken at one time. A smooth rounded shape with a flat bottom would be one choice. Different colors of the device could be used in its manufacture.

SEQUENCE LISTING

"Not applicable."

What is claimed is:

1. An egg breaking device consisting of: an elongated top member, having an upper surface and an opposed bottom surface; four downwardly projecting egg cracking ribs mounted to the bottom surface of the top member; an elongated bottom member having an upper surface and opposed bottom surface; four egg supporting concavities formed in the upper surface of the bottom member; a hinge connecting the top member with the bottom member such that the concavities are directly below the projecting ribs, wherein the top member is rotated downwardly so as to bring into contact the projecting ribs with the supported eggs for cracking.

* * * * *